2,622,440

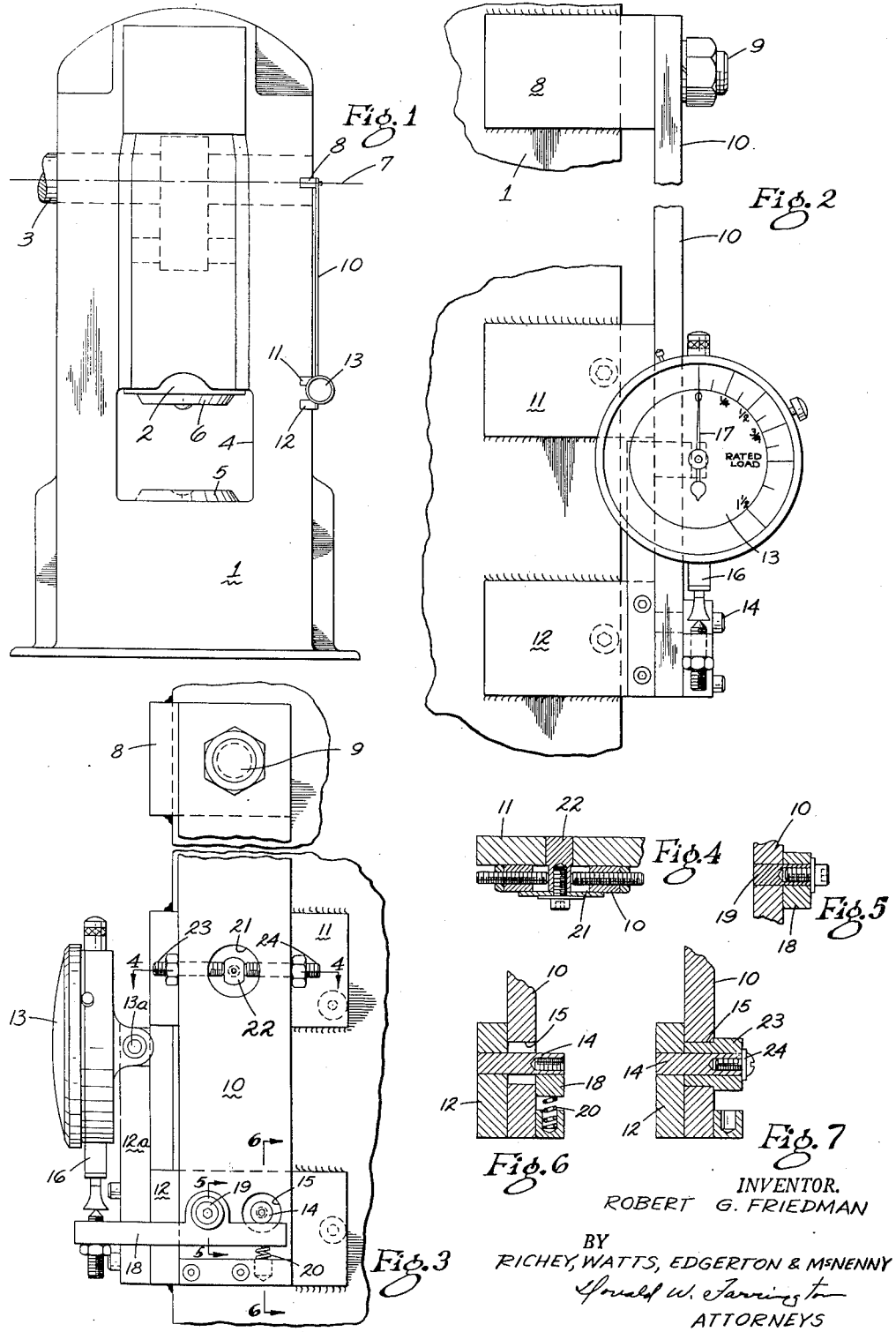
Dec. 23, 1952   R. G. FRIEDMAN   2,622,440
PRESSURE GAUGE FOR FORGING PRESSES
Filed April 27, 1951
INVENTOR.
ROBERT G. FRIEDMAN
BY
RICHEY, WATTS, EDGERTON & McNENNY
ATTORNEYS Patented Dec. 23, 1952

UNITED STATES PATENT OFFICE 2,622,440

PRESSURE GAUGE FOR FORGING PRESSES

Robert G. Friedman, Tiffin, Ohio, assignor to The National Machinery Company, Tiffin, Ohio, a corporation of Ohio Application April 27, 1951, Serial No. 223,293

2 Claims. (Cl. 73—88)

This invention relates to forging presses and more particularly to a press providing a visual indication of the stress in the press frame and bearings due to forging loads whereby the loads imposed upon the press and the forging dies may be accurately controlled and held within safe operating limits.

Numerous efforts have been made to provide low cost apparatus which would accurately indicate the loads imposed upon the parts of a forging press and wherein the apparatus would be applicable to different sizes of press and which would be rugged in construction and withstand the rough usage to which such machines are subjected. In the absence of a visual indication of the forging loads imposed on the parts of a forging machine, it has been necessary to provide an experienced highly-skilled operator or set-up man to properly mount the dies and to determine whether or not the part to be forged was being worked within safe operating limits for a particular press.

According to the present invention a strain gauge is provided for the frame of a press or similar machine which strain gauge is constructed and arranged so that the deformation in the press frame due to working loads is accurately indicated to the operator and is located in a position where it may be conveniently observed by the operator whereby the maximum operating efficiency of the press may be obtained.

It is among the objects of my invention to provide a forging press having a frame, a reciprocating header slide mounted in the frame, which header slide is driven by a rotatable crank or eccentric shaft, and wherein the deformation of the press frame occasioned by the forging load is accurately indicated on an instrument convenient to the operator.

It is a further object of my invention to provide a press according to the preceding object wherein the deformation over a substantial portion of the frame is transmitted to an indicator by an elongated bar having one end anchored to the frame near the axis of the rotating shaft which drives the header slide and the other end mounted on the frame for limited movement with respect to the frame and wherein the said other end is arranged to operate a lever, which lever in turn is operatively connected to an indicator.

Further objects and advantages relating to simplicity in design, flexibility in application and accuracy and long life of the apparatus will appear from the following description and the appended drawings wherein:

Fig. 1 is an elevation showing a vertical forging press embodying my invention;

Fig. 2 is an enlarged front elevation of the forging press strain gauge made according to my invention;

Fig. 3 is a side elevation of the apparatus shown in Fig. 2;

Fig. 4 is a sectional view taken on the plane indicated at 4—4 of Fig. 3;

Fig. 5 is a sectional view taken on the plane 5—5 of Fig. 3 with parts broken away showing details of the lever mounting in the strain gauge of my invention;

Fig. 6 is a sectional view taken on the plane 6—6 of Fig. 3; and,

Fig. 7 is a sectional view taken on the plane 6—6 showing the strain gauge parts as secured for shipment.

Referring to the drawings, my invention is shown in the environment of a vertical forging press 1 which is provided with a reciprocating header slide 2 adapted to be driven by crank shaft 3. The press is provided with a working opening in the frame as at 4 and a bed frame die 5 is secured to the bed frame at the bottom of said work opening where it is arranged to cooperate with the header slide die 6 so as to forge a blank at each reciprocation of the header slide 2. The work opening 4 is at a convenient working height for the operator.

The horizontal plane of the axis of the crank shaft 3 is indicated at 7 and secured to the exterior corner of the frame 1 in the region of the plane indicated at 7 is a bracket 8. The bracket 8 is angular in form so as to embrace the corner of the bed frame and is preferably welded in place to the bed frame as shown in Figs. 2 and 3. That arm of the angular bracket 8 which overhangs the side of the frame 1 is provided with a projecting stud 9 which serves as a pivotal support for the depending elongated bar 10. Brackets 11 and 12 similar in form to the bracket 8 are secured to the bed frame in a plane adjacent the upper horizontal limits of the work opening 4 so that the indicator 13 carried by the bracket 12 is near the "eye level" of the operator of the press. The lower bracket 12 has fixed thereto an outwardly projecting pin 14 which extends through the opening 15 at the lower end of the bar 10. As will be noted in Figs. 3 and 6, the diameter of the opening 15 is considerably greater than the outside diameter of the pin 14 extending therethrough, and as this description proceeds, it will be understood that the opening 15 accommodates the movement between the bar 10 and the pin 14 which movement corresponds to the deformation in the bed frame 1 between the upper pin 9 and the lower pin 14.

The indicator 13 is secured to the bracket 12 by means of the plate 12a and the pin 13a and includes a movable stem member 16 which is operatively connected to the indicator needle 17 so as to show on the indicator the movement of the stem 16. The particular design of the indicator 13 forms no essential part of the present invention and several types of indicator in common use may be incorporated in my strain gauge without substantially changing the mode of operation or results obtained by my invention. Ordinarily, the movable stem 16 carries a rack which meshes with a pinion gear fixed to the axis of the indicator needle 17 so that any movement of the stem 16 with respect to the indicator 13 is reflected in swinging movement of the needle 17.

Preferably the indicator dial bears indicate such as shown in Fig. 2 wherein about 90° of the needle movement carries the needle around from zero to a full load or rated load for the particular installation. Other markings beyond rated load such as 1½ times rated load are useful in showing the operator the amount by which the forging load exceeds the rated load of the press.

The movement of the stem 16 of the indicator is determined by the movement of a lever 18 which is pivoted on the lower end of the longitudinal bar 10 on pivot pin 19. That end of the lever 18 remote from the stem 16 is disposed beneath the fixed pin 14 carried by the bracket 12. The lever 18 is urged into engagement with the pin 14 by means of a spring 20 carried by the lower end of the bar 10. Since the pin 14 and the bracket 12 which supports the pin 14 is anchored to the frame of the machine and since the opening 15 in the longitudinal bar 10 has a diameter exceeding the diameter of the pin 14, deformation of the frame between the pin 14 and the pin 9 which supports the bar 10 causes the lever 18 to turn about its pivot and move the stem 16 of the indicator. Since the effective length of the lever arm between the pin 14 and the pivot 19 for the lever is considerably less than the effective length of the lever arm between the pivot 19 and the actuated element 16 of the deformation of the frame is multiplied by the pivoted lever arrangement.

In order that the strain gauge apparatus may be applied to various sizes of forging press, I have provided means for varying the effective length of the lever arm 18 between the pins 14 and 19. This advantage in the apparatus is achieved by changing the angularity of the longitudinal bar 10 with respect to the fixed pin 14. The bar 10 is apertured as at 21 where it loosely surrounds a fixed pin 22 carried by the bracket 11. The pin 22 is provided with opposed flat portions within the opening 22 and adjusting screws 23 and 24 extend transversely of the bar 10 so as to engage the flat sides of the pin 22. The longitudinal bar 10 is pivoted at 9 and adjustment of the screws 23 and 24 changes the distance between the fixed pin 14 and the pivot pin 19 for the lever 18. Since the total deformation in the frame of a large press may safely exceed the total deformation in a small press, the said screws 23 and 24 are adjusted on a large press so as to increase the distance between pins 14 and 19 whereas when the apparatus is installed on a small press the screws 23 and 24 are adjusted to shorten the lever arm between pins 14 and 19. With the arrangement here described, the press manufacturer may determine at the factory the correct distance between the pins 14 and 19 for each particular size of forging press and furnish such information to press owners who desire to apply the strain gauge of my invention to their presses. In this way one size or model of strain gauge apparatus may be used upon presses which vary as to size, and the only difference in installation is a difference in spacing between the pins 14 and 19 which may be conveniently determined by the user.

To insure against damage to the apparatus during shipment, or during installation on the press, the bar 10 is restrained against movement with respect to the pin 14 by the means shown in Fig. 7 wherein the lever 18 is removed from the assembly and a plug 23 having a shank portion diameter corresponding to the opening 15 is secured within said opening by means of screw 24 received by the fixed pin 14. When the apparatus is assembled on the machine and set up for use, it will be understood that the plug 23 is removed and the parts arranged as shown in Figs. 3 and 6 with the spring 20 beneath the lever 18.

By mounting the indicator 13 adjacent the upper limits of the work opening 4, the strain gauge apparatus is above the area where forging scale and the heat from the forging blanks may adversely affect its operation. By the use of a long bar 10, the major portion of the deformation in the frame between the crank shaft 3 and the bed frame dies is measured and thus an accurate determination of the forging load is obtained. The use of a long bar 10 and a single transverse lever 18 minimizes the possibility of error in measuring the frame deformation. The bar 10 gives a direct value for frame deformation over the frame length spanned by the bar and the pivoted lever magnifies such deformation in a ratio of approximately 3 to 1. It will be understood that this ratio is changed by angular adjustment of the bar to suit the particular size of machine. It will also be understood that the sensitivity of the deformation may be increased in the indicator by employing a stem-to-needle ratio that will swing the needle through a wider angle on the indicator such as for instance, a swing of 200° from zero to full rated load. It will also be understood that the indicator may be equipped with a second needle which does not return to zero and will hold the maximum reading obtained by any particular swing of the needle 17. Such hold needle is useful in that the supervisor may determine whether or not a particular machine has during any particular period exceeded the rated load of the press and the supervisor may by adjustment of the dies or other press adjustment eliminate the cause of the overload before repeated overloads have damaged the bearings or other parts of the press.

The regular use of a strain gauge apparatus according to my invention makes it possible for relatively unskilled operators to correctly set up the dies in the press and enables the user to effect a quick and positive determination as to whether or not a particular press is being used efficiently. It will enable a forging press shop to use each machine up to its full rated load capacity and will assist die makers in the design of the dies so that they may avoid forging loads which would exceed the rated load capacity of a particular forging press.

Although I have shown and described one form of my invention in considerable detail, it will be appreciated that numerous modifications may be made therein without departing from the scope of the invention as defined in the following claims.

What is claimed is:

1. A strain gauge for a machine frame comprising an elongated bar having one end thereof pivotly secured to the frame, and the other end thereof supported for limited movement with respect to the frame, a fixed pin carried by the frame adjacent said other end, means to adjust the angular relationship between said bar and said fixed pin, a pivoted lever carried by the lower end of said bar, one end of said lever arranged to bear against said fixed pin and the other end of said lever being operatively connected to an indicator whereby longitudinal movement of said bar with respect to said fixed pin actuates said indicator.

2. A strain gauge for a machine frame comprising an elongated bar having one end thereof pivoted to the frame, and the other end thereof supported for limited movement with respect to the frame, a fixed pin carried by the frame adjacent said other end, means intermediate the ends of the bar to adjust the angular relationship between said bar and said fixed pin, a transverse lever carried by the lower end of said bar, said lever being pivoted on said bar near one end of said lever and said one end of said lever adapted to engage said fixed pin and the other end of said lever being operatively connected to an indicator whereby longitudinal movement of said bar with respect to said fixed pin due to frame deformation actuates said indicator.

ROBERT G. FRIEDMAN.

REFERENCES CITED

The following references are of record in the file of this patent:

UNITED STATES PATENTS

| Number | Name | Date |
| --- | --- | --- |
| 1,122,239 | John | Dec. 22, 1914 |
| 2,099,662 | Slonneger | Nov. 16, 1937 |
| 2,152,556 | Messinger | Mar. 28, 1939 |
| 2,322,418 | Crawford | June 22, 1943 |